(12) United States Patent
Blanchard et al.

(10) Patent No.: US 8,559,463 B2
(45) Date of Patent: Oct. 15, 2013

(54) SYSTEMS AND METHODS FOR PROVIDING EFFICIENT BANDWIDTH UTILIZATION IN PACKET SWITCHED NETWORKS

(75) Inventors: Scott David Blanchard, Mesa, AZ (US); Edward Kerry Orcutt, Scottsdale, AZ (US); Dean Paul Vanden Heuvel, Chandler, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 495 days.

(21) Appl. No.: 12/034,297

(22) Filed: Feb. 20, 2008

(65) Prior Publication Data

US 2009/0207854 A1    Aug. 20, 2009

(51) Int. Cl.
*H04J 3/18* (2006.01)
(52) U.S. Cl.
USPC .......................................... 370/477; 370/521
(58) Field of Classification Search
USPC ......... 370/230, 235, 400, 401, 465, 466, 477, 370/521
See application file for complete search history.

(56) References Cited

U.S. PATENT DOCUMENTS

| | | | |
|---|---|---|---|
| 6,542,992 B1* | 4/2003 | Peirce et al. ................... | 713/153 |
| 7,319,667 B1* | 1/2008 | Biederman .................... | 370/231 |
| 2001/0030963 A1* | 10/2001 | Yoshimura et al. ............ | 370/393 |
| 2002/0064190 A1* | 5/2002 | Sikora et al. .................. | 370/537 |
| 2002/0080966 A1 | 6/2002 | Blanchard et al. | |
| 2003/0223465 A1 | 12/2003 | Blanchard | |
| 2004/0022206 A1 | 2/2004 | Blanchard | |
| 2004/0022275 A1 | 2/2004 | Blanchard | |
| 2004/0072562 A1 | 4/2004 | Heuvel et al. | |
| 2004/0120357 A1* | 6/2004 | Kekki ............................ | 370/521 |
| 2004/0136476 A1* | 7/2004 | Rosen et al. .................. | 375/340 |
| 2004/0165527 A1* | 8/2004 | Gu et al. ....................... | 370/229 |
| 2005/0037767 A1* | 2/2005 | Kim et al. ..................... | 455/450 |
| 2005/0095982 A1 | 5/2005 | Blanchard et al. | |
| 2005/0259723 A1 | 11/2005 | Blanchard | |
| 2005/0271066 A1* | 12/2005 | Valadarsky .................... | 370/401 |
| 2006/0112185 A1* | 5/2006 | van Bemmel ................. | 709/238 |
| 2006/0245455 A1 | 11/2006 | Bossler et al. | |
| 2006/0292765 A1 | 12/2006 | Blanchard et al. | |
| 2008/0049713 A1* | 2/2008 | Yam .............................. | 370/349 |

OTHER PUBLICATIONS

Internet RFC 3242: "RObust Header Compression (ROHC): A Link-Layer Assisted Profile for IP/UDP/RTP" dated Apr. 2002.
Internet RFC 3095: "RObust Header Compression (ROHC): Framework and four profiles: RTP, UDP, ESP, and uncompressed" dated Jul. 2001.

* cited by examiner

*Primary Examiner* — Ricky Ngo
*Assistant Examiner* — Wei-Po Kao
(74) *Attorney, Agent, or Firm* — Ingrassia Fisher & Lorenz, P.C.

(57) ABSTRACT

Systems and methods are described for efficiently transmitting packetized data from a sender to a receiver over a communications link. A compression context is established between the sender and the receiver based upon commonalities in each of the data packets prior to transmitting the data over the communications link. The data is compressed according to the compression context to thereby create compressed data packets, and the compressed data packets are transmitted to the receiver across the communications link. By establishing compression contexts prior to transmission, the need for in-band signaling is reduced or eliminated.

19 Claims, 5 Drawing Sheets

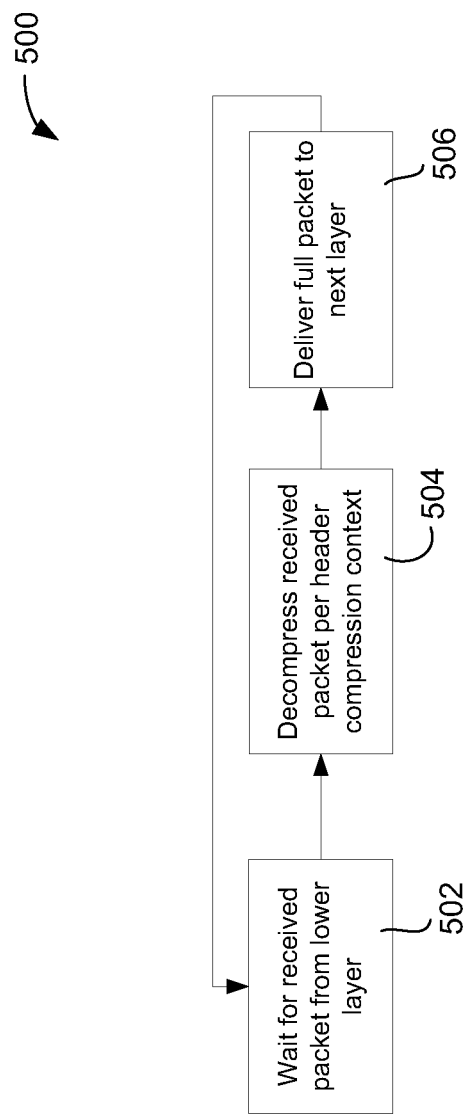

SYSTEMS AND METHODS FOR PROVIDING EFFICIENT BANDWIDTH UTILIZATION IN PACKET SWITCHED NETWORKS

STATEMENT REGARDING FEDERALLY SPONSORED RESEARCH OR DEVELOPMENT

The United States government has a paid-up license in this invention and the right in limited circumstances to require the patent owner to license others on reasonable terms as provided by the terms of Contract Number N00039-04-C-2009 awarded by Space and Naval Warfare Systems Command (SPAWAR).

TECHNICAL FIELD

The present disclosure generally relates to digital communications networks, and more particularly relates to techniques and systems for providing efficient bandwidth utilization in a packet-switched network.

BACKGROUND

As wireless and other networks become increasingly available and increasingly able to provide advanced levels of service, digital communications are becoming more and more commonplace. Indeed, portable communications devices such as telephones, personal digital assistants, portable computers and the like are widely carried and relied upon by consumers for continuous communications. Similarly, the demand for wireless and other communications services continues to be significant in industrial, governmental, homeland defense, military and other settings. In military and homeland defense settings, in particular, it can be very important that certain communications be quickly and accurately received in an efficient manner.

Computer networks generally operate using a variety of protocol "languages" that allow different nodes to communicate with each other. Many of these protocols are widely deployed on the public Internet and elsewhere, and are therefore referred to as "internet protocols". In particular, the TCP/IP family of protocols has been widely deployed in public, private and governmental settings. These protocols, while widely used, can have a number of inherent drawbacks in certain settings and applications. The packet-switched nature of certain internet protocols, for example, is generally considered to be relatively inefficient for use in routing certain types of traffic, including voice traffic. This is because every conventional TCP/IP packet used to transport the underlying data contains routing and other "header" information that consumes bandwidth on the transport link. While this header information typically allows for effective routing (as well as improved security and/or other features), the extra data added to the data stream potentially reduces the amount of traffic that can be transmitted on a particular communications link. Wireless communications links, for example, are particularly limited in bandwidth, so the extra bandwidth consumption used to transmit conventional TCP/IP and other packet-switched protocol headers is disadvantageous.

A number of attempts have been made to reduce the adverse effects of packet-switched headers, with varying levels of success. The robust header compression (ROHC) protocols set forth in Internet RFCs 3095 and 3242, for example, describe several techniques for compressing packet switched data through the use of in-band signaling. This signaling, however, is less useful over links that experience significant time delays, such as satellite links. Moreover, the in-band signaling consumes over-the-air bandwidth, thereby reducing the overall effectiveness of such techniques.

As a result, it is desirable to create systems and techniques for efficiently delivering packet-switched data. Other desirable features and characteristics will become apparent from the subsequent detailed description and the appended claims, taken in conjunction with the accompanying drawings and this background of the invention.

BRIEF SUMMARY

According to various exemplary embodiments, systems and methods efficiently transmit data comprising a plurality of packets from a sender to a receiver over a communications link. In one embodiment, a system for communicating with a second station via a communications link includes an application, a packetizer and a compressor. The application is configured to generate data. The packetizer is configured to receive the data from the application and to transform the data into data packets each formed in accordance with a pre-determined packet-based protocol format. The compressor is configured to receive the data packets from the packetizer, to establish a compression context with the remote base station based upon commonalities in the data packets prior to transmitting the packetized data on the communications link, to compress the data packets according to the compression context to thereby create compressed packets in a link format different from the pre-determined packet-based protocol format, and to supply the compressed packets for transmission to the remote station via the communications link.

Other embodiments include systems and methods for efficiently transmitting data comprising a plurality of packets from a sender to a receiver over a communications link. A compression context is established between the sender and the receiver based upon commonalities in each of the plurality of data packets prior to transmitting the data over the communications link. The data is compressed according to the compression context to thereby create compressed data packets, and the compressed data packets are transmitted to the receiver across the communications link.

Other embodiments, features and details are set forth in additional detail below.

BRIEF DESCRIPTION OF THE DRAWINGS

The present invention will hereinafter be described in conjunction with the following drawing figures, wherein like numerals denote like elements.

FIG. 5 is a flowchart of an exemplary data decompression technique.

DETAILED DESCRIPTION

The following detailed description of the invention is merely example in nature and is not intended to limit the invention or the application and uses of the invention. Furthermore, there is no intention to be bound by any theory presented in the preceding background of the invention or the following detailed description of the invention.

According to various exemplary embodiments, stateless compression can be implemented between a sender and a receiver by establishing a compression context prior to transmission of the underlying data on a communications link. This compression context can be based upon commonalities in the various data packets sent between a source and a destination, including commonalities found in higher level protocols than the link protocol used over the communications link. Internet-type sender and receiver addresses, for example, generally do not change during the course of a communications session, and therefore need not be transmitted in every data packet sent over the communications link. Similarly, many other higher-level data fields relating to checksums, message lengths or the like can be derived from lower-level content, thereby eliminating the necessity of transmitting such information in multiple packets. By reducing or eliminating duplicative or readily-derived information from higher-level protocol headers, then, a very effective compression scheme can be formulated prior to data transmission without the need for in-band or out-of-band signaling during the course of transmission itself.

Figure 1:
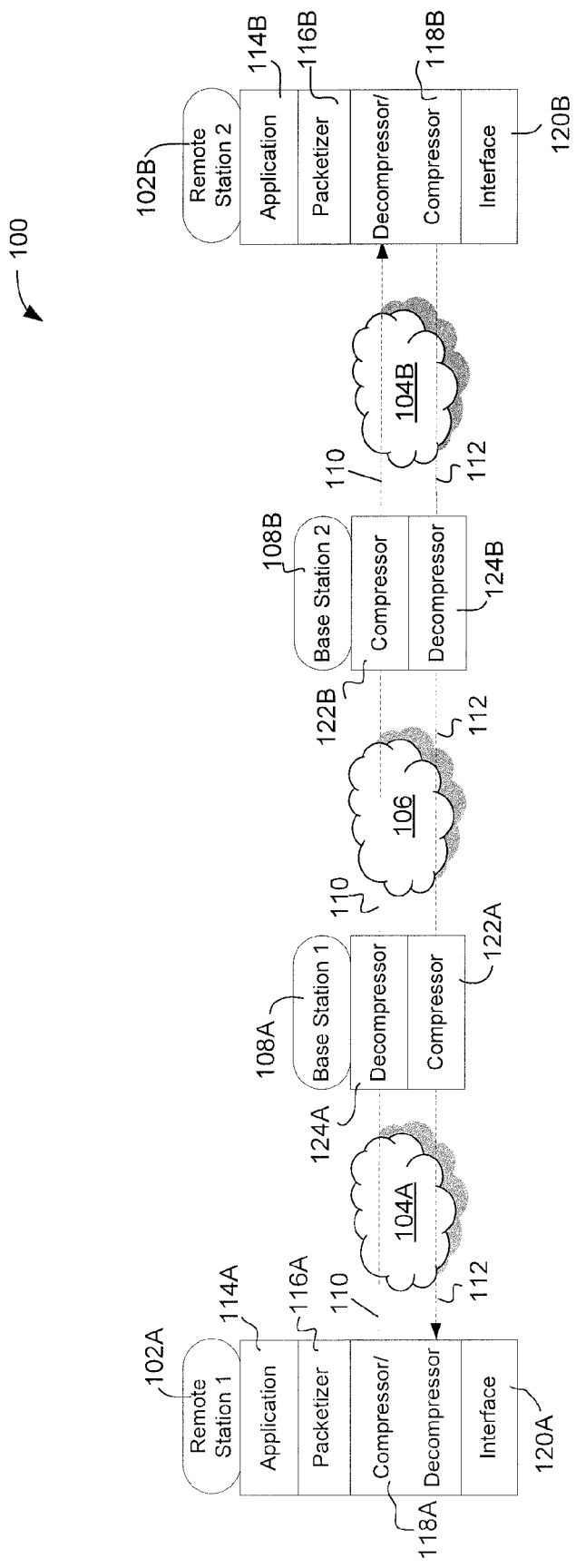
FIG. 1 is a block diagram of an exemplary network communications system.

Turning now to the drawing figures and with initial reference to FIG. 1, an exemplary system 100 for providing communications between two remote stations 102A-B suitably includes one or more intervening base stations 108A-B facilitating communications over one or more communications links 104A-B, 106. In the example shown in FIG. 1, remote station 102A and remote station 102B communicate with each other via two wireless networks 104A, 104B that are inter-connected by a terrestrial network 106. In this instance, communications between the wireless networks 104A-B and the terrestrial network 106 are managed by base stations 108A-B. Networks 104A-B may represent satellite, cellular and/or other communications links, for example, with base stations 108A-B providing appropriate interfaces to network 106, which may be any public, private, governmental or other telecommunications network. Note that system 100 shown in FIG. 1 is intended to demonstrate two-way communications between two nodes 102A-B operating on separate but inter-connected networks 104A-B for completeness. In practice, however, the various concepts, systems and techniques described herein may be deployed on any portion of system 100 (e.g. any single link between any remote station or base station) without being deployed on the other links, as appropriate for the particular embodiment.

Remote stations 102A-B are any nodes capable of communicating via communications links 104A-B, respectively. In various embodiments, remote stations 102A-B are any sort of portable telephones, personal digital assistants, portable computing devices or other user equipment (UE) capable of providing digital voice and/or other data communications on links 104A-B.

In a typical embodiment, each remote station 102A-B includes an application 114A-B that is capable of generating data in response to user inputs. Application 114A-B may be any sort of computer program, applet or other logic capable of generating data of any type, and in any format. Application 114A-B may be a radio telephone application, for example, that digitizes voice or other audio signals received at a microphone or other input device, and provides equivalent digital representations of the received audio signals for transport over links 104A-B. In such cases, application 114A-B (or a companion application) may also decode digitized audio signals received from links 104A-B for playback to the user on an audio speaker or the like. In such embodiments, the remote station 102A-B effectively functions as a digital telephone, with audio communications being sent via communications link 104A-B. Other embodiments may include alternate or additional applications 114A-B capable of providing other types of data, such as still or moving video imagery, audio or multi-media content, and/or any other type of conventional digital data as appropriate.

Each remote station 102A-B also typically includes a packetizer feature 116A-B capable of receiving data generated by application 114A-B and providing a packetized output in an appropriate format. In various embodiments, packetizer 116A-B is a conventional implementation of TCP/IP or other protocols that is capable of forming data packets that can be routed on data network 106 or the like. In a typical implementation, packetizer 116A-B represents a TCP/IP implementation capable of encapsulating audio or other digital data into datagrams formatted in accordance with conventional user datagram protocol (UDP, described, e.g., in RFC 768), transmission control protocol (TCP, described, e.g., in RFC 793), real-time transport protocol (RTP, described, e.g., in RFC 1889) and/or other transport layer formats. These datagrams can then be encapsulated into network-layer packets formatted in accordance with internet protocol (IP, described, e.g., in RFCs 791 and 2460) or another routable protocol as appropriate. While TCP/IP protocols are currently the most widely deployed, other protocol formats, versions or families may be used in any number of equivalent embodiments.

In many conventional packet-switched systems, the packetized data is further encapsulated within a link layer protocol frame for transmission on communications link 104A-B. The particular link layer protocol used varies widely from embodiment to embodiment, and may include any version of the packet data convergence protocol (PDCP) or the like. Conventional PDCP includes some forms of data compression, several of which are set forth in Internet RFCs 3095 and 3242. In various embodiments, however, the conventional compression used within the link layer protocol may be replaced or supplemented with data compression according to any of the various techniques discussed herein.

In particular, redundancies or commonalities in data residing in headers for transport, network or other protocol layers that are "higher" than the link layer protocol (e.g. according to the Open Systems Interconnect (OSI) model or any other reference) can be identified prior to transmission so that the redundant information contained within the headers need not be repeatedly sent during the course of transmitting the underlying data. The redundant data can be reformed at the receiving end of the communication link, thereby allowing for subsequent routing and delivery of the message while significantly reducing the amount of bandwidth needed to transmit the underlying data over certain links. While this technique violates conventional notions of encapsulation and protocol isolation, it can be exploited across one or more data links 104A-B to significantly improve performance and efficiency of system 100.

To that end, remote stations 102A-B suitably include appropriate link layer logic 118A-B for compressing and/or decompressing data transmitted and/or received on communications links 104A-B. In the exemplary embodiment shown in FIG. 1, messages 110 transmitted from remote station to 102A to station 102B are compressed at remote station 102A, decompressed at base station 108A, re-compressed at base station 108B, and then finally decompressed at remote station 102B. Similarly, messages 112 transmitted from remote station 102B to remote station 102A are compressed at remote station 102B, decompressed at base station 108B, re-compressed at base station 108A, and finally decompressed at remote station 102A. As noted above, not all of the data transmitted across communications links 104A-B need to be compressed in all embodiments. To the contrary, compression may be established in either or both of links 104A-B, and for either or both of the sending and receiving directions in either link. Moreover, compression techniques and contexts used in the various compressed links may vary; that is, different compression contexts can be used on different links, and/or on the sending and receiving directions of a common link. Additional detail about various techniques for establishing compression contexts and implementing various forms of compression are described in increasing detail below.

Each remote station 102A-B transmits and/or receives properly formed messages on communications links 104A-B via any suitable interfaces 120A-B. Interfaces 120A-B may represent any sort of hardware, software, firmware and/or other logic capable of providing a physical and/or media access control (MAC) layer interface between a remote station 102A-B and a communications link 104A-B as appropriate.

Base stations 106A-B are any nodes, devices, modules or logic capable of communicating with one or more remote stations 102A-B via a suitable communications link 104A-B. In various embodiments, base stations 106A-B represent satellite or cellular base stations capable of sending and receiving communications via a corresponding communications link 104A-B. In such embodiments, base stations 106A-B may also provide an interface to a conventional network 106. In an exemplary implementation, base stations 108A-B may provide an interface between a satellite uplink providing communications links 104A-B and a conventional public, private, government or other network 106 as appropriate.

As noted above, data compression in accordance with the techniques described herein may be implemented on data sent and/or received across any communications link 104A-B. To that end, one or more base stations 108A-B may have compression or decompression features as appropriate. In the exemplary embodiment shown in FIG. 1, base station 108A has a compression module 122A that compresses data transmitted to one or more remote stations 102A via communications link 104A and a decompression module 124A that decompresses messages received from remote stations 102A via communications link 104A. Base station 108B similarly has a compression module 122B and a decompression module 124B for compressing and decompressing messages sent and received on link 104B. In practice, compression modules 122A-B and decompression modules 124A-B may be combined (e.g. in a link layer protocol handler), and may be implemented in any sort of hardware, software, firmware and/or other logic as appropriate.

In practice, then, compression/decompression may be instituted on either or both of the sending and receiving directions of any communication over links 102A-B involving remote stations 102A or 102B. Generally speaking, compression and/or decompression logic is built into remote stations 102A-B and base stations 108A-B to allow for the establishment of compression contexts between these nodes in any appropriate manner. As noted above, compression can involve sending information that is typically contained within "higher order" protocols (e.g. RTP, UDP, TCP, IP and other protocols) as part of a compression context prior to transmission of the actual underlying data. Because this information is relatively static throughout the course of the communications session, it need not be repeated in each subsequent packet that is transmitted across communications link 104A-B. As a result, the amount of bandwidth consumed by the packet headers is significantly reduced, or, in some embodiments, even eliminated entirely.

Figure 2:
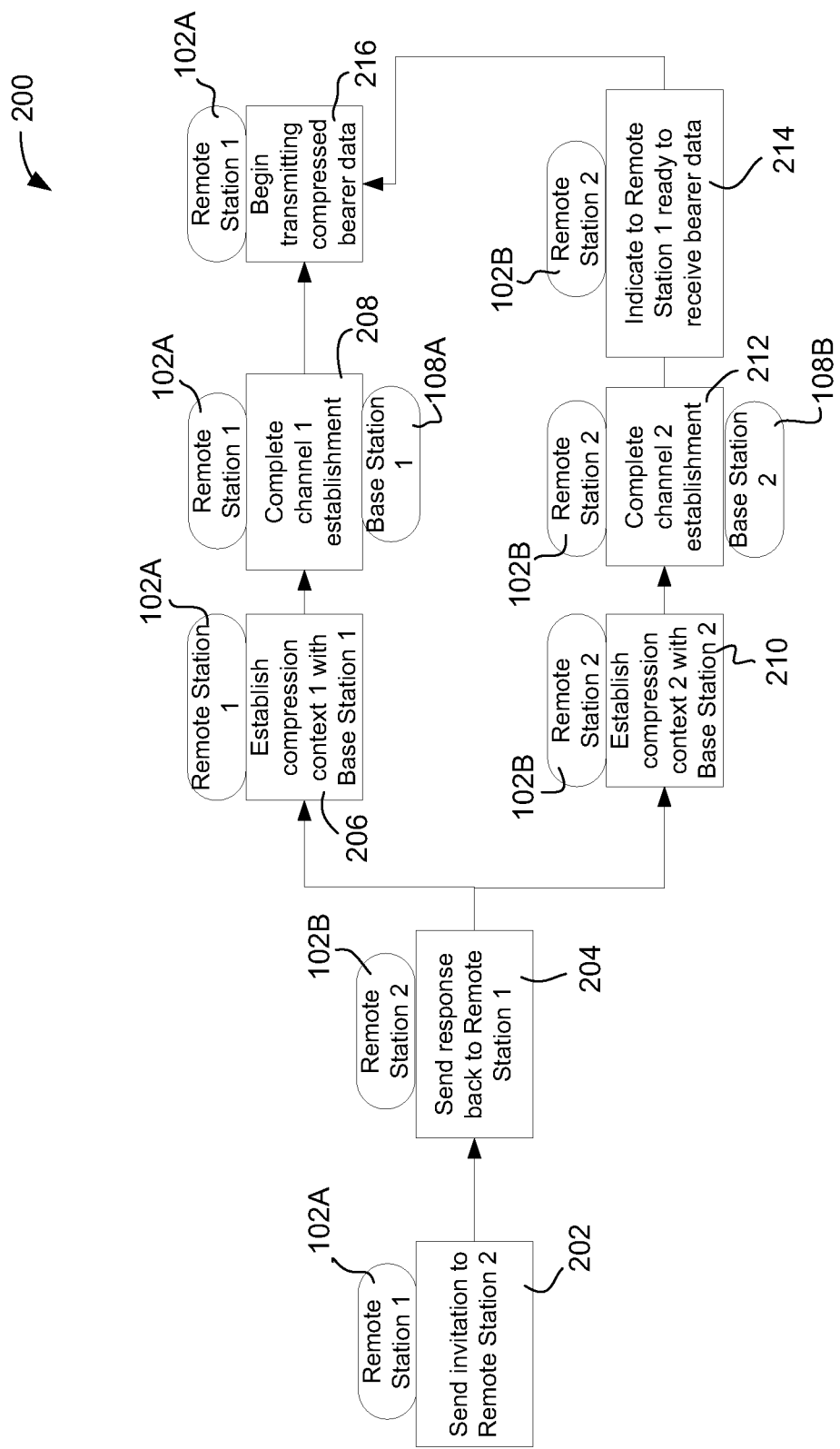
FIG. 2 is a data flow diagram of an exemplary process for establishing efficient communications between two nodes.

FIG. 2 shows an exemplary process 200 that may be executed to establish compressed communications with a remote node across communications link 104. This process is typically executed by software within link layer logic 118 and/or compressor/decompressor logic 122/124 as described in FIG. 1, although alternate embodiments may establish compression features in any manner.

With reference now to FIG. 2, an exemplary process 200 for establishing compressed communications suitably includes the broad steps of sending an invitation from a sender to a receiver (step 202), receiving a response from the receiver (step 204), establishing compression contexts between the remote and base station ends of communication link 104A-B (steps 206, 210), receiving confirmation that the contexts are complete (steps 208, 212), and then subsequently transferring compressed bearer data (step 216). Each of these steps may be carried out, for example, with software executing at an appropriate node, or in any other manner. While the exemplary embodiment shown in FIG. 2 shows an end-to-end session established between two remote stations 102A-B, wherein station 102A is arbitrarily selected as the sender or initiating node and station 102B is arbitrarily selected as the receiving or accepting node. Equivalent embodiments may be differently structured, and may not provide compression on both the forward and reverse links, or may simply compress communications sent or received over a single link 104A-B as appropriate.

Most nodes do not begin communications using a known IP or other address of the receiving node. Typically, in the case of voice communications and the like, the IP address or other identifier associated with the receiving node is initially unknown, thereby preventing the immediate establishment of a complete compression context. Instead, the sender typically provides some identification of the recipient (e.g. a phone number) to an information management system (IMS) or other entity on network 106 that is able to re-map the recipient identification to a valid address. In such cases, the intermediary entity receives the invitation, remaps the recipient-identifying information contained within the invitation to a valid address, and then forwards the invitation to the appropriate receiver.

An invitation to communicate is therefore sent (step 202) from the sending node (station 102A in this example) to the receiving node, either directly or though one or more intermediary nodes as discussed above. The receiving node (e.g. station 102B) accepts and processes the invitation using conventional techniques, and transmits a response message back to the sending node (step 204). This response typically includes an IP address or other identifying information associated with the receiving node, so upon receipt of the response, the sending node typically has enough information to establish a compression context with its associated base station (step 206). Note that upon receipt of the invitation, the receiving node has relatively complete information about the sending node, so the receiving node can typically begin establishing a compression context with its base station upon receipt of the initial invitation (step 210) without waiting for further communications from the sender.

Establishing a compression context (steps 206, 210) typically involves providing information to the node on the opposite side of communications link 104 that describes information that allows reconstruction of higher-level packet headers or the like. Such information includes static information such as sending and receiving addresses, protocol identifiers, and the like. Further, by identifying the protocol(s) being compressed, the decompressing node can make further assumptions about the compressed data, such as the locations of checksum fields, message length descriptors, and other data fields that can be re-populated based upon information contained in lower level protocol constructs. If a lower layer protocol (e.g. a link layer, MAC layer and/or physical layer protocol) can be relied upon to provide reliable message receipt, for example, it can be readily assumed that any UDP, RTP, IP or other higher-layer data fields contained within the message are valid. If the lower-layer protocols are assumed to preserve the integrity of the data, then checksums and similarly-constructed fields contained in higher-layer protocol fields can be compressed out of the data transmitted across a particular link 104. As a result, there is no need to transmit UDP, RTP, IP or other checksums as part of the PDCP message, since these checksums can be simply re-computed at the decompressing end of communications link 104. Similarly, if proper delivery is assured through reliability-ensuring constructs in the lower level protocol, then message length fields or other descriptions of the higher-level protocol content can simply be re-computed at the decompressing end, and need not be transmitted across the link 104.

The compression context can therefore be established in any manner by simply making the decompressing node aware of redundant information that will not be subsequently (and repeatedly) transmitted, and by making the decompressing node aware of any additional data fields or other constructs in the underlying data that will need to be reconstituted at the receiving end. This can be accomplished by simply notifying the decompressing node of the underlying protocols contained within the underlying message in any manner. Indeed, if relatively few message protocols are used on communications link 104, then it may be possible for the receiving node to ascertain the particular protocols used in the message without express instruction from the sending node. Establishing a compression context, then, simply involves making the receiving node aware of any information that can be used to re-constitute the received message.

In the example shown in FIG. 2, compression is assumed to be similar in both sending and receiving directions. For example, data sent on path 110 (FIG. 1) is assumed to have similar qualities as data received on path 112 (FIG. 1). In many embodiments, this assumption holds, since bi-directional traffic in a given protocol will typically be very similar, albeit with swapped sending and receiving addresses. As a result, it may be sufficient in many embodiments to establish a compression context in a sending (or receiving) direction, with this context providing sufficient information for compressing or decompressing data flowing in the opposite direction. In various embodiments, however, separate compression contexts can be established for data flowing in opposite directions. That is, steps 206/210 may be repeated for information flowing in opposing directions in various alternate but equivalent embodiments. To that end, separate compression contexts could be established between any remote station 102 and base station 108, for example, to allow different forms of compression to be used for sending and receiving data. Further, it is not necessary that compression exist in both sending and receiving directions across any particular link 104, or that any applied compression be the same in both directions across the link 104.

After the appropriate compression context is established for a particular link 104, the node at the opposite end of the link 104 confirms that the channel is complete (steps 208, 210) and the receiving node (remote station 102B in this example) notifies the sending node (e.g. station 102A) that it is ready to receive data (step 214). Compressed bearer data may then be sent and received as appropriate (step 216). In the exemplary embodiment shown in FIG. 2, the compressing contexts are assumed to be initiated by the sending and receiving nodes, which in this example are the remote stations 102A-B. In equivalent embodiments, however, compression contexts may be initiated by the base stations 108A-B, by intervening gateways, or by any other nodes as appropriate.

Figure 3:
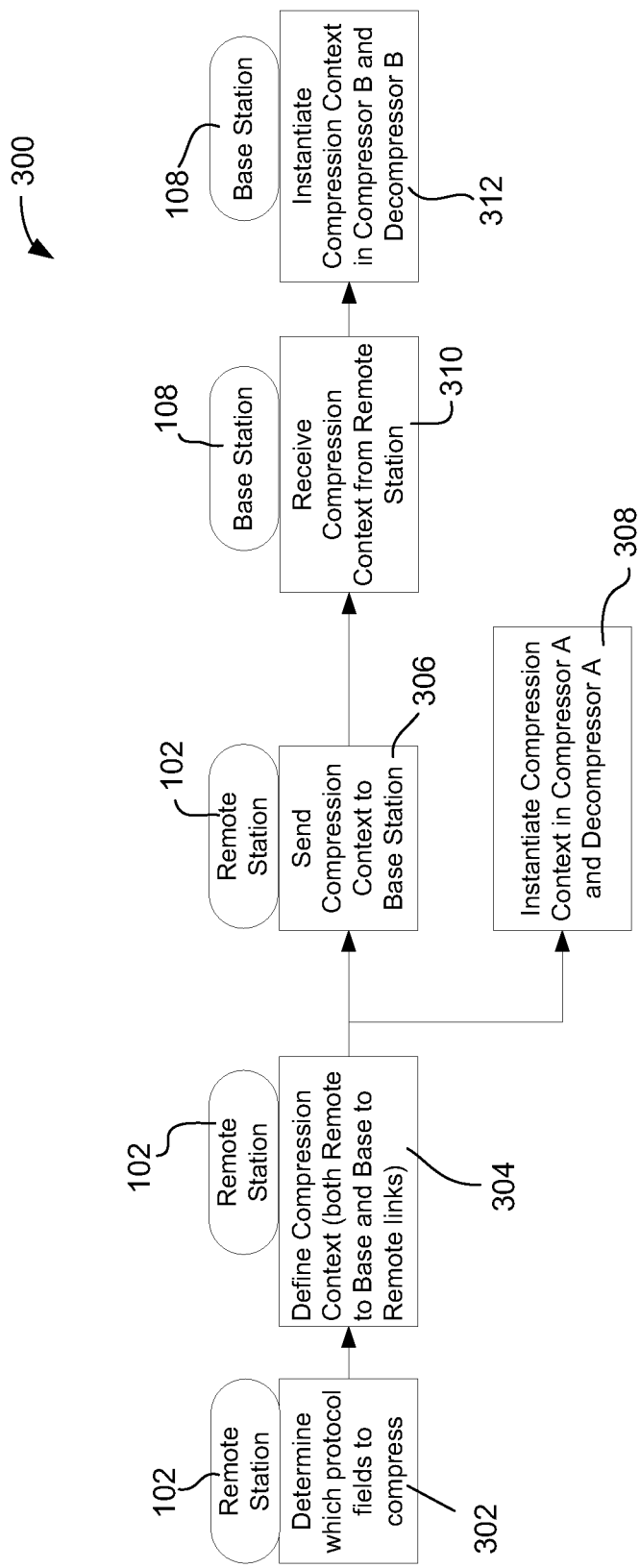
FIG. 3 is a data flow diagram showing an exemplary process for establishing a data compression context.

FIG. 3 shows additional detail of an exemplary process 300 for establishing compression on a communications link 104. Like process 200 described above, process 300 is typically implemented in software, firmware or other logic executing within any remote station 102 and/or base station 108. While FIG. 3 shows steps 302, 304, 306 and 308 executing within a remote station 102 (e.g. in link layer logic 118) and steps 310 and 312 executing within a base station 108 (e.g. in compression logic 122 and/or decompression logic 124), in practice these may be swapped such that the base station initiates compression with the remote node. Many other processes could be similarly formulated in a wide array of equivalent embodiments.

With reference now to FIG. 3, process 300 suitably begins by determining which protocol fields to compress (step 302). In practice, step 302 generally involves identifying higher level protocols (e.g. RTP, TCP, UDP, IP) contained within the bearer data, and then ascertaining which portions of the protocol headers can be compressed, or eliminated in subsequent transmissions. As noted above, data populating protocol fields that remain static between packets (e.g. send and receive addresses, port numbers, protocol identifiers and/or the like) need not be sent with every packet. Similarly, fields that may change between packets but that are derivable from lower-level protocol information can simply be re-computed at the receiving side of link 104, thereby allowing for additional compression.

Once this information is determined, then the protocol context can be defined (step 304) as appropriate. In some embodiments, only one compression context is used on a particular link 104, with the particular data fields populating compressed protocol fields being sent prior to transmission of the message. In other embodiments, various compression contexts may be formulated to allow compression of different underlying protocols, and/or varying levels of compression. In an exemplary embodiment, different contexts may be established, for example, for simple IP compression, UDP and IP compression, RTP/IP or RTP/UDP/IP compression, and/or the like. In a further embodiment, one or more compression modes that allow for multiple or varying contexts can be provided, as described more fully below.

With the compression context established, this information can be shared with the node at the opposing end of the communications link 104, and used to compress/decompress data in subsequent communications (step 308). In the exemplary embodiment illustrated in FIG. 3, for example, the remote station 102 identifies the context to the base station 108 (step 306) via communications link 104. Upon receiving the context information (step 310), the receiving node is able to instantiate compression and decompression in subsequently-exchanged messages (step 312). As noted above, the compression context need not be the same for both the transmit and receive directions across communications link 104, although in many embodiments the similarity of data transmitted and received during a voice or data communications session will provide for bi-directional symmetry in compression as well.

Figure 4:
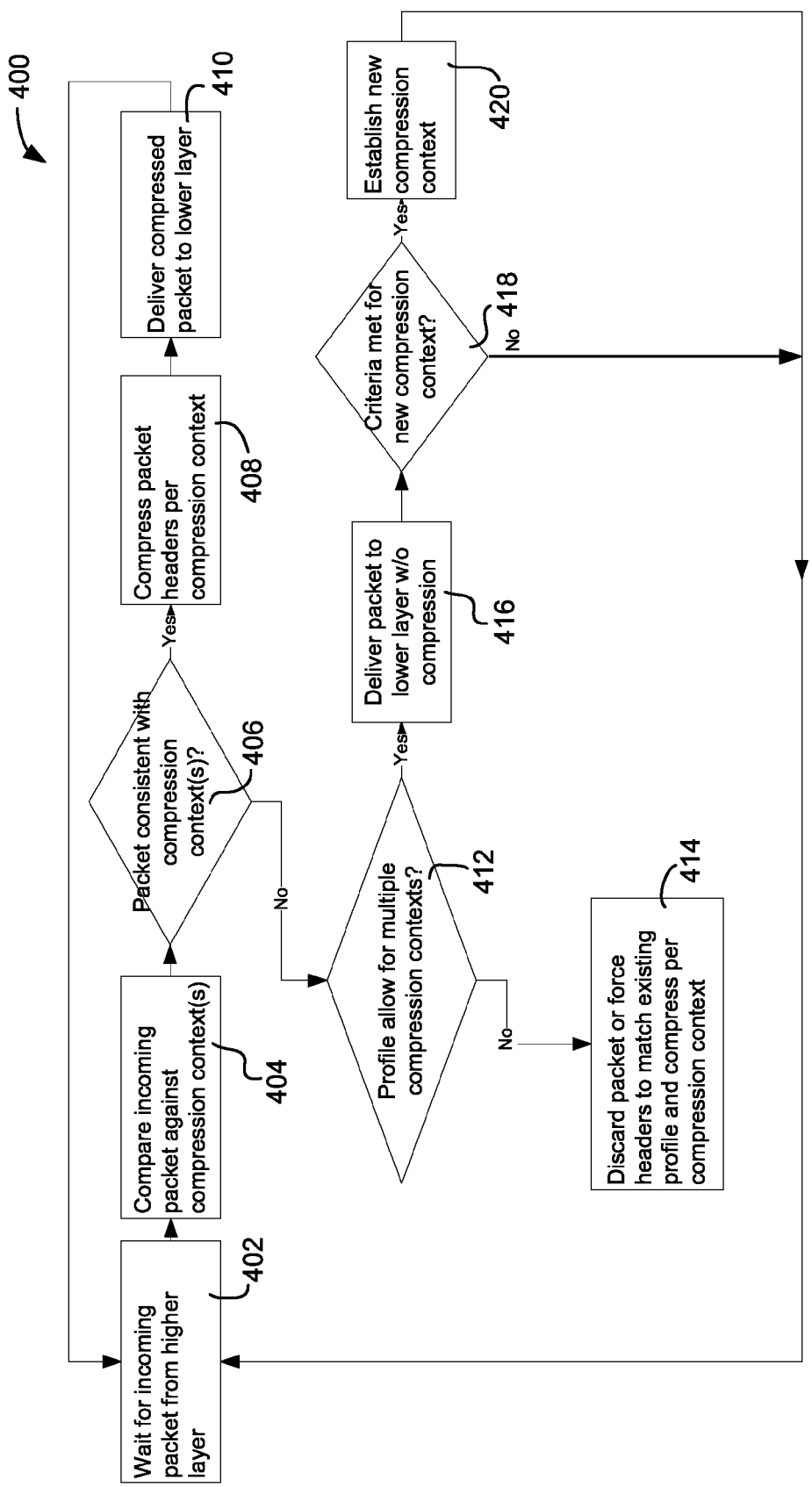
FIG. 4 is a flowchart of an exemplary data compression technique.

FIG. 4 shows an exemplary process 400 for implementing compression in any transmitting node. The exemplary embodiment illustrated in FIG. 4 assumes that multiple compression contexts may be available; in alternate embodiments, such functionality may not be available, as described more fully below. In practice, process 400 may be implemented in software, firmware or other logic in any compressing node, including nodes 102A-B, nodes 108A-B or the like.

With reference now to FIG. 4, the compression process 400 suitably begins by receiving incoming data packets from a higher-level application (e.g. application 114 or packetizer 116 in FIG. 1). As higher-level packets are received (step 402), they are compared against currently established compression contexts to see if they are consistent (step 406). If the packet matches a currently-established compression context, then the packet is compressed according to that context (step 408). As noted above, compression step 408 involves removing any commonalities in higher-level protocol fields, stripping out any protocol fields that can be re-constructed at the decompressing end of link 104, and/or taking any other steps as appropriate. The compressed packets are delivered to the lower layer processing logic to form transport packets that can be transmitted on link 104 (step 410).

If the packet received in step 402 is not consistent with any established compression contexts (step 406), a number of options are available. In various embodiments that do not allow for multiple contexts (step 412), the non-conforming packet may be simply discarded (step 414). Alternatively, any non-matching data fields in the protocol headers of the packet can be simply discarded, and information from the compression context can be assumed to be acceptable for the non-conforming packet. In still other embodiments, the non-conforming packet can be delivered without compression, or with compression in accordance with any conventional technique.

In embodiments wherein multiple compression contexts are allowed (step 412), non-conforming packets may be initially delivered without compression (step 416) until a new compression context can be established. New compression contexts can be created in any manner, and in accordance with any parameters or criteria (step 418). In various embodiments, a new context is created after identifying a threshold number of packets having common attributes. The actual threshold value can vary from two packets to several hundred or more. When the threshold number is exceeded, then a new context can be established (step 420) for subsequent data transmissions.

Embodiments that support multiple compression contexts may implement the multiple contexts in any manner. In various embodiments, each context is established using the processes described above (e.g. with respect to FIG. 2), and compressed data is sent over link 104 with a relatively short "context identifier" (CID) attached to the relevant packets. A single-byte identifier, for example, can be used to uniquely represent up to 256 different contexts without significant overhead. In still further embodiments, one of the context identifier values (e.g. "0" or "$FF") can be used to identify transmissions of uncompressed data as appropriate. This CID may be pre-pended, appended or otherwise attached to the relevant packet(s) in any manner.

FIG. 5 shows an exemplary process 500 for decompressing data received via a communications link 104. In various embodiments, process 500 is implemented in software, firmware or other logic executing within remote nodes 102 and/or base stations 108 as appropriate. Generally speaking, the decompression process 500 simply involves receiving the compressed packets (step 502), decompressing the received packets in accordance with the appropriate compression context (step 504), and delivering the decompressed packets to a higher layer or other logic (step 506). The first step 502 simply involves receiving the compressed data from link 104 or its interface. Decompressing the packets (step 504) simply involves re-constituting the redundant data fields in the encapsulated protocols and/or generating checksum, message length and/or other computed data fields in the encapsulated protocols as appropriate. Delivering the packet (step 506) involves making the decompressed data available to higher layers (e.g. application 114, packetizer 116, and or the like) for subsequent processing.

By using data compression contexts as described herein, significant improvements in bandwidth utilization can be realized. In particular, bandwidth used to transmit significant portions (if not the entirety) of the TCP/IP or other protocol headers found in the packetized data can be conserved, thereby greatly improving the efficiency of the communications system. Moreover, because compression contexts can be established at the beginning of the communications session and thereafter remain relatively unchanging, the overhead used for conventional in-band state transition messages can be conserved as well. As a result, a highly efficient packet switched communications system is provided that is suitable for use with satellite or other wireless networks.

While at least one example embodiment has been presented in the foregoing detailed description of the invention, it should be appreciated that a vast number of equivalent variations exist. It should also be appreciated that the embodiments described above are only examples, and are not intended to limit the scope, applicability, or configuration of the invention in any way. Rather, the foregoing detailed description will provide those skilled in the art with a convenient road map for implementing various examples of the invention. It should be understood that various changes may be made in the function and arrangement of elements described in an example embodiment without departing from the scope of the invention as set forth in the appended claims and their legal equivalents.

What is claimed is:

1. A system for communicating with a second station via a communications channel established over a communications link, the system comprising:
   an application configured to generate data;
   a packetizer configured to receive the data from the application and to transform the data into data packets each formed in accordance with one of a plurality of pre-determined packet-based protocol formats; and
   a compressor configured to receive the data packets from the packetizer, to negotiate a plurality of stateless compression contexts with the second station prior to establishing the communications channel, wherein each of the plurality of stateless compression contexts is based upon commonalities in one of the packet-based protocol formats of the data packets including address information about the second station, and, after establishing the communications channel with the second station, to remove the commonalities from the data packets according to the compression contexts to thereby create compressed packets in link formats different from the pre-determined packet-based protocol formats, and to supply the compressed packets for transmission to the second station via the communications channel.

2. The system of claim 1 wherein the pre-determined packet based protocol formats are higher level protocols than the link formats.

3. The system of claim 1 further comprising a decompressor configured to accept received data packets in the link formats from the communications link and to decompress the received data packets in accordance with the plurality of compression contexts to thereby provide decompressed data packets to a recipient for subsequent processing.

4. A method for efficiently transmitting data comprising a plurality of packets from a sender to a receiver over a communications channel over a communications link, the method comprising the steps of:
  negotiating a first compression context and a second compression context between the sender and the receiver based upon commonalities in pre-determined packet-based protocol formats used by at least some of the plurality of data packets including address information about the sender and the receiver, wherein the negotiating is performed prior to establishing the communications channel with the receiver;
  after establishing the communications channel with the receiver, comparing an incoming one of the plurality of packets to the first compression context;
  if the incoming packet is consistent with the first compression context, removing the commonalities in the data according to the first compression context to thereby create a first compressed data packet in a first format and transmitting the first compressed data packet to the receiver via the communications channel; and
  if the incoming packet is consistent with the second compression context, removing the reproducible content of the incoming packet to thereby create a second compressed data packet in a second format that is different from the first format, and transmitting the second compressed data packet to the receiver across the communications channel.

5. The method of claim 4 wherein the negotiating step comprises identifying the commonalities in each of the multiple packets, transmitting the commonalities to the receiver, and removing the commonalities from the data prior to transmitting the data over the communications link.

6. The method of claim 4 wherein the packet-based protocol format is a higher level protocol than a protocol used to transmit the compressed data packets across the communications link.

7. The method of claim 6 wherein the commonalities comprise data fields formatted according to either or both of the internet protocol and user datagram protocol.

8. The method of claim 6 wherein the commonalities comprise data fields formatted according to the real-time transport protocol.

9. The method of claim 4 removing further comprises removing a checksum field from the data packets received at the sender.

10. The method of claim 4 wherein data packets that are inconsistent with the compression context are not sent to the receiver.

11. The method of claim 4 wherein data packets that are inconsistent with the compression context are sent to the receiver via the communications link without compression.

12. The method of claim 4 further comprising the step of attaching a context identifier to each of the compressed data packets and each of the second compressed data packets prior to transmission across the communications link.

13. The method of claim 4 wherein the establishing step further comprises recognizing the second compression context between the receiver and the sender based upon the data.

14. The method of claim 13 further comprising the steps of receiving received data packets via the communications link and decompressing the received data packets using the second compression context.

15. The method of claim 4 further comprising decompressing the data according to the compression context to thereby create decompressed data packets corresponding to the data packets transmitted from the sender, and providing the decompressed data packets to a recipient.

16. The method of claim 15 wherein the decompressing comprises replacing the commonalities in the data packets transmitted from the sender based upon the first and second compression contexts.

17. The method of claim 16 wherein the decompressing comprises computing a checksum field in accordance with the packet-based protocol format and inserting the checksum field into the decompressed data packets that are transmitted to the recipient.

18. A method for processing data packets formatted according to a plurality of common packet-based protocol formats each having a plurality of data fields, the method comprising:
  prior to establishing a communications channel with a transmitter of the data packets, negotiating a plurality of stateless compression contexts over a communications link, wherein each of the plurality of stateless compression contexts describes commonalities in the packet-based protocol formats that are found in the compressed data packets including address information about the transmitter of the data packets;
  establishing the communications channel with the transmitter via the communications link;
  after establishing the communications channel, receiving the data packets over the communications link, wherein the data packets are received in a plurality of compressed formats in which the commonalities have been removed;
  restoring the commonalities in the data packets in accordance with the packet-based protocol format using each of the plurality of stateless compression contexts; and
  providing the restored data packets to a recipient.

19. The method of claim 18 wherein the restoring further comprises computing a checksum field in accordance with the packet-based protocol format.

* * * * *